United States Patent
Dolganow et al.

(10) Patent No.: US 9,100,268 B2
(45) Date of Patent: Aug. 4, 2015

(54) APPLICATION-AWARE MPLS TUNNEL SELECTION

(75) Inventors: Andrew Dolganow, Kanata (CA); John Fischer, Stittsville (CA)

(73) Assignee: Alcatel Lucent, Boulogne-Billancourt (FR)

(*) Notice: Subject to any disclaimer, the term of this patent is extended or adjusted under 35 U.S.C. 154(b) by 1292 days.

(21) Appl. No.: 12/071,861

(22) Filed: Feb. 27, 2008

(65) Prior Publication Data

US 2009/0213858 A1 Aug. 27, 2009

(51) Int. Cl.
*H04W 4/00* (2009.01)
*H04L 12/701* (2013.01)
*H04L 12/46* (2006.01)
*H04L 12/725* (2013.01)
*H04L 12/723* (2013.01)
*H04L 12/801* (2013.01)
*H04L 12/813* (2013.01)
*H04L 12/851* (2013.01)
*H04L 12/935* (2013.01)

(52) U.S. Cl.
CPC ............ *H04L 45/00* (2013.01); *H04L 12/4633* (2013.01); *H04L 45/306* (2013.01); *H04L 45/50* (2013.01); *H04L 47/10* (2013.01); *H04L 47/20* (2013.01); *H04L 47/2433* (2013.01); *H04L 49/3009* (2013.01); *H04L 2212/0025* (2013.01)

(58) Field of Classification Search
None
See application file for complete search history.

(56) References Cited

U.S. PATENT DOCUMENTS

| | | | | |
|---|---|---|---|---|
| 6,567,408 B1* | 5/2003 | Li et al. | ...................... | 370/395.31 |
| 7,012,919 B1* | 3/2006 | So et al. | ......................... | 370/392 |
| 7,496,661 B1* | 2/2009 | Morford et al. | ................ | 709/224 |
| 7,499,412 B2* | 3/2009 | Matityahu et al. | ............. | 370/255 |
| 2007/0121615 A1* | 5/2007 | Weill et al. | ...................... | 370/389 |
| 2007/0133419 A1* | 6/2007 | Segel | ............................. | 370/236 |
| 2008/0019371 A1* | 1/2008 | Anschutz et al. | ............. | 370/394 |

FOREIGN PATENT DOCUMENTS

WO 2007064585 6/2007

OTHER PUBLICATIONS

Anonymous, Cisco ASR 1000 Series Aggregation Services Routers: Qos Architecture and Solutions, Cisco System Inc., Feb. 21, 2008, pp. 1-12.
C.J.(Charlie) Liu, Tracking DSCP Marking of Packets in a Qos Enabled Triple-play IP Network, Third International Conference on Networking and Services, Jun. 1, 2007.
Anontmous: "Cisco ASR 1000 Series Aggregation Services Routers: QoS Architecture and Solutions", Feb. 21, 2008, pp. 1-12.
Charlie Liu C J Ed: "Tracking DSCP Marketing of Packets in a QoS Enabled Triple-play IP Network" Networking and Services, 2007. ICNS. Third International Conference On, IEEE. Jun. 1, 2007, pp. 21-21.
International Search Report dated Mar. 7, 2009 for PCT/IB2009/051313.

* cited by examiner

*Primary Examiner* — John Blanton
(74) *Attorney, Agent, or Firm* — Kramer & Amado, P.C.

(57) ABSTRACT

Various exemplary embodiments are a method and related system and computer-readable medium including one or more the following: receiving a data packet; analyzing the data packet using deep packet inspection (DPI) to determine an application associated with the data packet; determining an MPLS tunnel corresponding to the application associated with the data packet; and forwarding the data packet through the MPLS tunnel. In various exemplary embodiments, the step of analyzing the data packet including examining information in layers 2 through 7 of the data packet or analyzing the data packet to match an application signature. Furthermore, in various exemplary embodiments, the method and related system and computer-readable medium also includes adding a marking to the data packet to indicate the application associated with the data packet.

20 Claims, 3 Drawing Sheets

APPLICATION-AWARE MPLS TUNNEL SELECTION

BACKGROUND OF THE INVENTION

1. Field of the Invention

This invention relates generally to routing of packets in a Multiprotocol Label Switching (MPLS) network.

2. Description of Related Art

In order to survive in the increasingly competitive telecommunications industry, modern telecommunications service providers must enable efficiency and flexibility in their network infrastructure, while also maintaining profitability. Multiprotocol label switching is a technology developed to allow service providers to address these needs by optimizing the network infrastructure at a minimal cost. MPLS networks provide a unified core that controls and forwards traffic from networks supporting different protocols. Thus, MPLS allows numerous diverse networks, such as IP, Ethernet, and ATM networks, to operate as a single, integrated network.

In addition to enabling interoperability, MPLS also allows service providers to implement service level agreements (SLA), in which the provider guarantees the customer a specified quality of service (QoS), such as availability, delay, or bandwidth. In typical implementations, a router outside of the MPLS core network differentiates between different traffic types and applies a Type of Service (ToS) marking to each packet to indicate the required level of service. As the packet enters the MPLS domain, the MPLS edge router uses the packet marking to assign an appropriate MPLS label to the packet. Based on the MPLS label, the packet is then routed over a predetermined label-switched path (LSP) in the MPLS core network.

As should be apparent from the above description, current implementations of QoS in MPLS networks limit the ability to achieve an optimized MPLS core network. First, because packet classification is performed outside of the network, these implementations are limited by the characteristics of the incoming packet. More specifically, because a packet header can only include a predetermined amount of data, these implementations severely limit the number of available packet classifications. In addition, every router forwarding packets into the MPLS network must determine the packet classification to effectively implement traffic management. Thus, rather than examining and classifying packets at a centralized location, each router must include additional hardware or software components to implement the packet inspection functionality.

More importantly, current implementations lack true-application awareness. In other words, current implementations examine only packet headers to classify traffic and do not examine the packet payload to identify an application. Thus, current implementations put service providers at a significant disadvantage, as the service providers are unable to sell application-specific service level agreements to MPLS network subscribers.

Accordingly, there is a need for application-aware MPLS tunnel selection that is performed within the MPLS core network. More specifically, there is a need for MPLS routing that inspects packets entering the MPLS core network, determines the associated application, and performs application-aware forwarding based on this determination.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY OF THE INVENTION

In light of the present need for application-aware MPLS tunnel selection, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In various exemplary embodiments, an MPLS router includes an integrated Deep Packet Inspection (DPI) device that identifies and classifies traffic based on information extracted from the header and/or data portion of an incoming packet. More specifically, various exemplary embodiments utilize the DPI device to identify an application associated with the packet and to provide this information to a routing module of the MPLS router. Then, in various exemplary embodiments, the MPLS router uses the application information to select an MPLS tunnel and forward the packet over this tunnel, thereby providing an application-optimized core.

Accordingly, various exemplary embodiments are a method and related computer-readable medium for application-aware forwarding of data packets through an MPLS core network comprising one or more of the following: receiving a data packet; analyzing the data packet using deep packet inspection (DPI) to determine an application associated with the data packet; determining an MPLS tunnel corresponding to the application associated with the data packet; and forwarding the data packet through the MPLS tunnel. Furthermore, in various exemplary embodiments, the step of analyzing the data packet using DPI comprises at least one of examining any combination of information in OSI layers 2 through 7 of the data packet and analyzing the data packet to match an application signature.

Additionally, in various exemplary embodiments, the method and computer-readable medium further comprises adding a marking to the data packet to indicate the application associated with the data packet. Thus, in various exemplary embodiments, the marking is a Differentiated Services Code Point. Furthermore, in various exemplary embodiments, the step of determining an MPLS tunnel corresponding to the application comprises accessing a mapping, the mapping indicating a correspondence between a plurality of applications and a plurality of MPLS tunnels. Finally, in various exemplary embodiments, the application associated with the data packet is selected from the group consisting of a web browser, an email application, a video application, and a peer-to-peer application.

In various exemplary embodiments, a system for application-aware forwarding of data packets through an MPLS core network comprises: a deep packet inspection (DPI) device, the DPI device analyzing a data packet to determine an application associated with the data packet; and a routing module, the routing module receiving the data packet from the DPI device and forwarding the data packet through an MPLS tunnel corresponding to the application associated with the data packet. In various exemplary embodiments, the DPI device and the routing module are integrated into a single networking device. Alternatively, in various exemplary embodiments, the DPI device is a standalone device coupled to a networking device, the networking device comprising the routing module.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
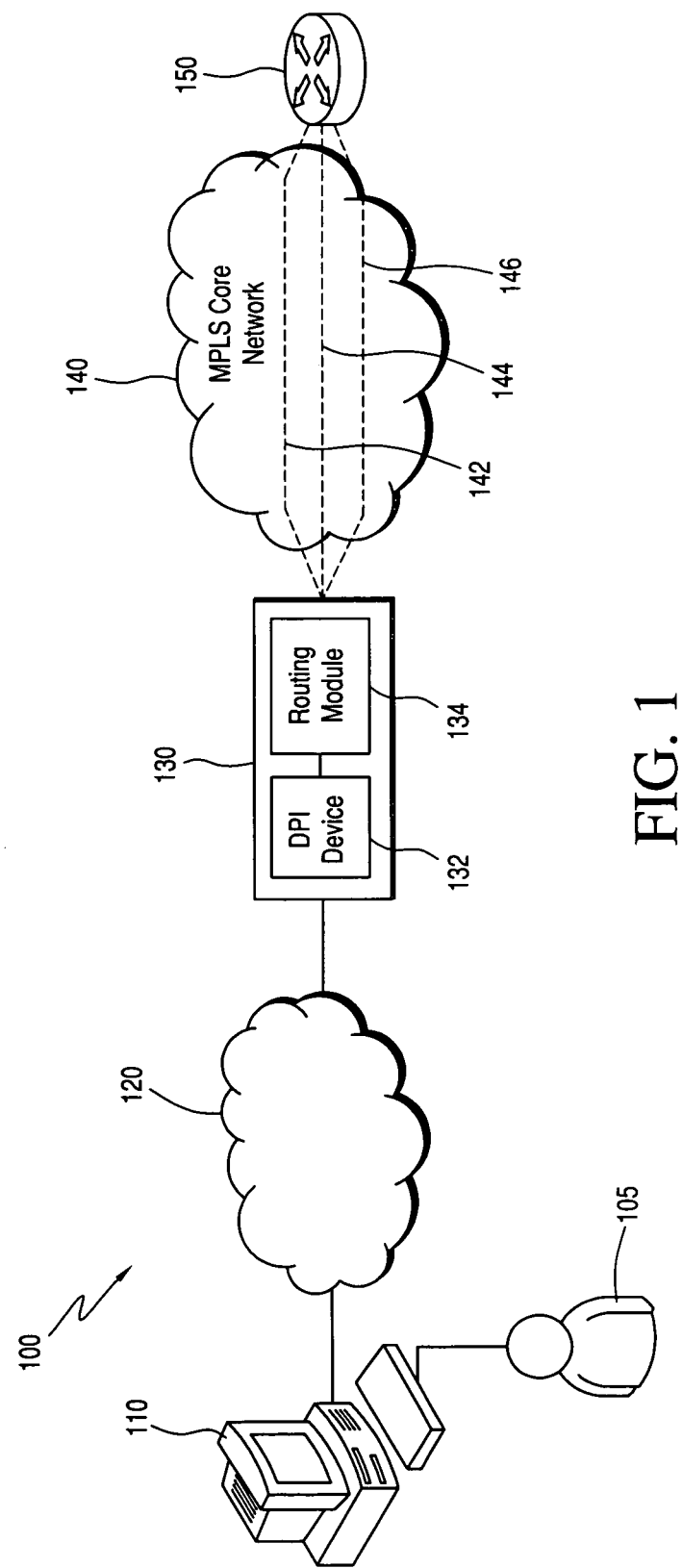
FIG. 1 is a schematic diagram of an exemplary embodiment of a system for application-aware forwarding in an MPLS network.

Referring now to the drawings, in which like numerals refer to like components or steps, there are disclosed broad aspects of various exemplary embodiments.

FIG. 1 is a schematic diagram of an exemplary embodiment of a system 100 for application-aware forwarding in an MPLS network. Exemplary system 100 includes subscriber 105, subscriber equipment 110, network 120, application-aware router 130, DPI device 132, routing module 134, MPLS core network 140, tunnel 1 142, tunnel 2 144, tunnel 3 146, and router 150.

In various exemplary embodiments, subscriber 105 owns or leases subscriber equipment 110, which is a personal computer, DSL or other modem, Voice-over IP equipment, firewall, router, switch, server, or any other device suitable for sending data and requests to network 120. Thus, in various exemplary embodiments, subscriber 105 utilizes subscriber equipment 110 to access a service offered by a telecommunications network service provider. More specifically, subscriber 105 pays service provider to utilize MPLS core network 140 based on one or more application-specific service level agreements. Thus, in various exemplary embodiments, subscriber pays a first amount for a guaranteed level of service with respect to a first application, while paying a different amount for a guaranteed level of service with respect to a second application.

In various exemplary embodiments, network 120 provides a connection between subscriber equipment 110 and application-aware router 130. Thus, in various exemplary embodiments, network 120 is an MPLS core network. It should be apparent, however, that network 120 may be any network capable of sending data and requests from subscriber equipment 110 to application-aware router 130.

In various exemplary embodiments, application-aware router 130 is a combination of hardware and software adapted to receive incoming data packets and forward the data packets into MPLS core network 140. More specifically, in various exemplary embodiments, application-aware router 130 includes a DPI device 132 and a routing module 134.

In various exemplary embodiments, DPI device 132 comprises specialized hardware and/or software that is capable of examining data packets received from network 120 to identify information associated with the packets. More specifically, DPI device 132 examines information not only in layers 2 through 4 of the Open Systems Interconnection (OSI) model, but also layers 5 through 7, as required. Thus, in various exemplary embodiments, DPI device 132 performs a "deep" analysis of the packet in order to identify an application associated with the traffic. For example, DPI device 132 may analyze a packet to determine whether the packet relates to email, streaming video, web browsing, peer-to-peer transfer, or any other application of interest to the service provider.

Furthermore, in various exemplary embodiments, DPI device 132 is configured to send information regarding the identified application to routing module 134. Thus, in various exemplary embodiments, DPI device 132 marks the packet based on the application determination. Accordingly, DPI device 132 may use a QoS marking such as a Differentiated Services Code Point (DSCP) marking to associate the identified application with the packet. Alternatively, in various exemplary embodiments, DPI device 132 associates an identifier with the packet, but does not modify the packet header.

In various exemplary embodiments, routing module 134 comprises hardware and/or software configured to receive the packet from DPI device 132 and forward the packet through a selected tunnel 142, 144, 146 in MPLS core network 140 based on the application information. Accordingly, in various exemplary embodiments, routing module 134 accesses a table or other mapping to identify the appropriate tunnel 142, 144, 146 based on the application information. The contents and operation of this mapping are described further below with reference to FIG. 2. After accessing the mapping to identify a particular tunnel, routing module 134 sends the packet into the identified tunnel 142, 144, 146 using an MPLS header.

It should be apparent that, although illustrated as two separate components in application-aware router 130, in various exemplary embodiments, DPI device 132 and routing module 134 are implemented as a single hardware and/or software component. Alternatively, in various exemplary embodiments, DPI device 132 is placed outside of application-aware router 130, such that DPI device 132 analyzes packets before the packets reach application-aware router 130.

In various exemplary embodiments, MPLS core network 140 comprises telecommunications hardware suitable for forwarding data packets received from networks that operate under different protocols. Thus, MPLS core network 140 may forward data packets received from an IP, Ethernet, ATM, or other type of network to router 150.

More specifically, in various exemplary embodiments, MPLS core network 140 comprises a plurality of tunnels 142, 144, 146. In various exemplary embodiments, each tunnel 142, 144, 146 comprises a plurality of routers and links, with each tunnel 142, 144, 146 having a different set of characteristics. Thus, each tunnel 142, 144, 146 may have a different bandwidth, delay, packet dropping probability, or other characteristic related to quality of service. Furthermore, tunnels 142, 144, 146 may be pre-established to accommodate specific applications or may be non-application specific, in which case applications are placed into the tunnel based on the characteristics of the tunnel. It should be apparent that although illustrated with three tunnels 142, 144, 146, in various exemplary embodiments, MPLS core network 140 includes any positive integer number of tunnels.

Finally, in various exemplary embodiments, router 150 comprises hardware and/or software that receives data packets from MPLS core network 140 and forwards the packet to another device. It should be apparent that although system 100 includes a router 150, in various exemplary embodiments, router 150 is replaced by a switch, bridge, or any other piece of hardware or software that is capable of receiving packets from MPLS core network 140.

Figure 2:
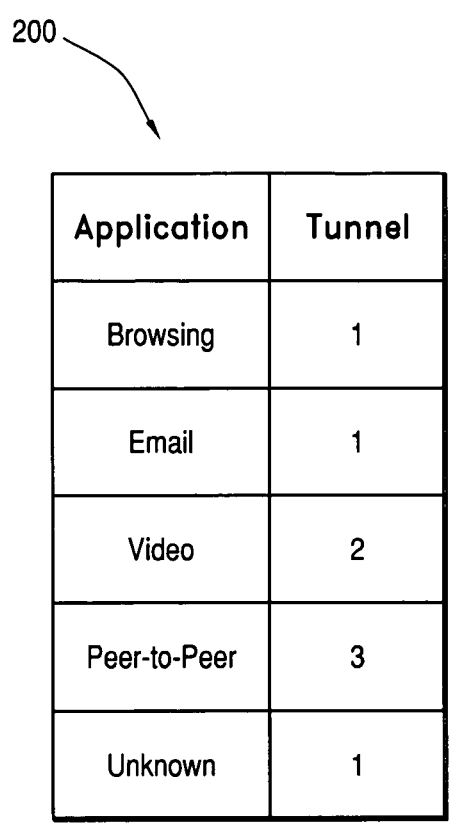
FIG. 2 is a schematic diagram of an exemplary mapping between applications and MPLS tunnels.

FIG. 2 is a schematic diagram of an exemplary mapping 200 between applications and MPLS tunnels. In various exemplary embodiments, mapping 200 is a table, database, or any other data structure that identifies the MPLS tunnel to be used for routing based on the application identified by DPI device 132. Thus, in various exemplary embodiments, mapping 200 is stored in application-aware router 130 or some other device. Alternatively, mapping 200 is hardcoded or otherwise programmed into the software or hardware of application-aware router 130 or some other device. Furthermore, in various exemplary embodiments, the values of mapping 200 are manually or automatically set by a service provider or other entity based on the physical characteristics of each tunnel.

Accordingly, as illustrated in FIG. 2, exemplary mapping 200 associates each application with a corresponding tunnel. Thus, packets related to browsing and email are forwarded from application-aware router 130 through tunnel 1 142, packets related to video are forwarded through tunnel 2 144, and packets related to peer-to-peer applications are forwarded through tunnel 3 146. Furthermore, packets related to an unknown application are sent through tunnel 1 142.

It should be apparent that, as illustrated in FIG. 2, exemplary mapping 200 includes the name of the application and the number of the corresponding tunnel for the sake of simplicity. In various exemplary embodiments, mapping 200 includes any information necessary to identify an application and forward the corresponding packet into an appropriate tunnel. Thus, in various exemplary embodiments, mapping 200 instead includes an alphanumerical identifier, DSCP value, or any other entry sufficient to identify an application associated with packets. Furthermore, in various exemplary embodiments, the second column of mapping 200 includes details of the specified tunnel, such as an MPLS tunnel label.

Figure 3:
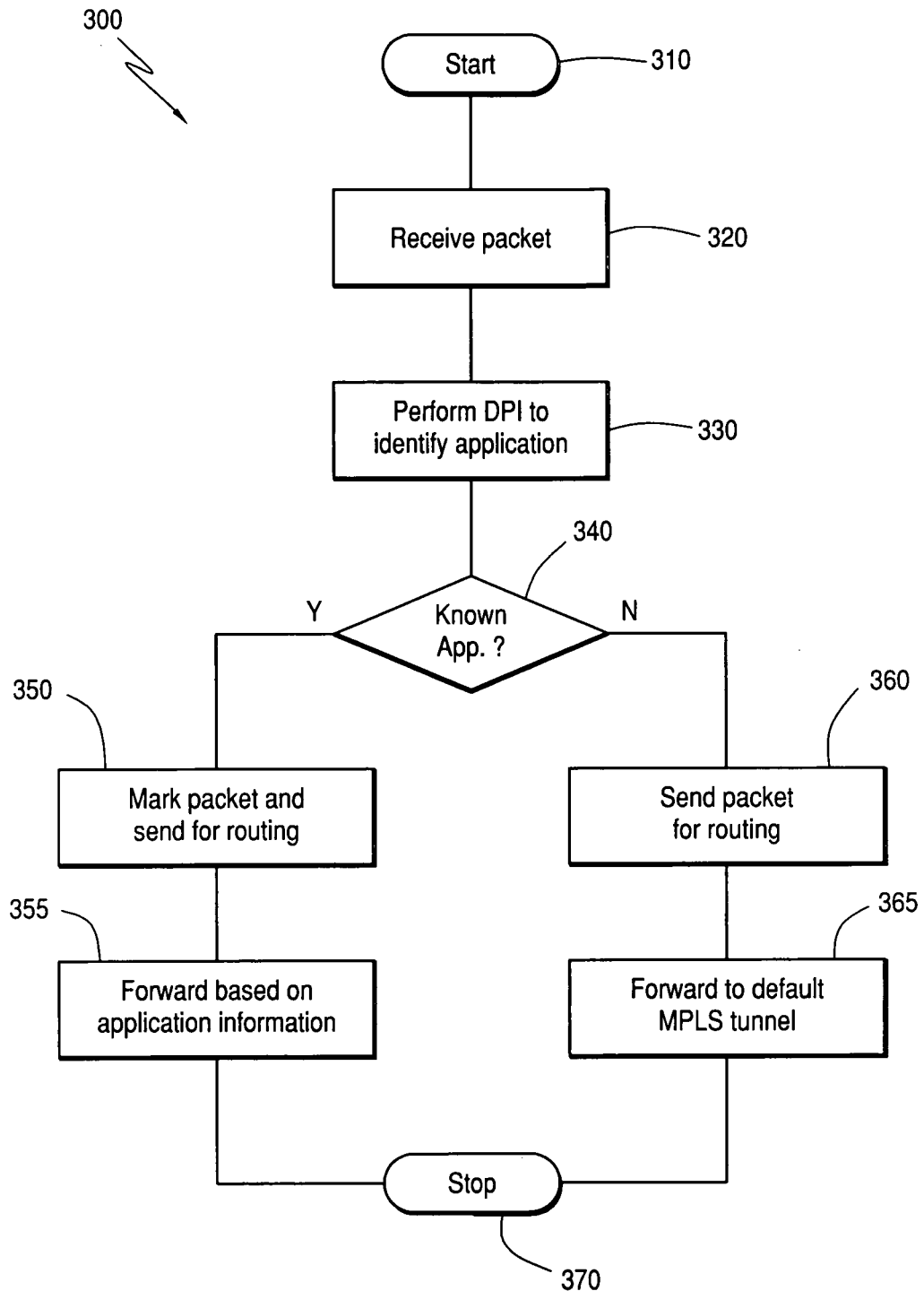
FIG. 3 is a flow chart of an exemplary embodiment of a method for application-aware forwarding in an MPLS network.

FIG. 3 is a flow chart of an exemplary embodiment of a method 300 for application-aware forwarding in an MPLS network. Exemplary method starts in step 310 and proceeds to step 320, where application-aware router 130 receives a packet from network 120. In various exemplary embodiments, the packet conforms to IP, ATM, Ethernet, or some other protocol.

After receiving the packet in step 320, exemplary method 300 proceeds to step 330, where DPI device 132 performs processing to identify an application associated with the packet. In various exemplary embodiments, DPI device 132 extracts information from any combination of layers 2 through 7 of the OSI model and performs analysis on the information to identify the application corresponding to the packet and the flow associated with the packet. In various exemplary embodiments, the analysis performed by DPI device 132 includes matching patterns and signatures across packet boundaries, performing hardware accelerated signature searches, running statistical and behavioral analysis on one or more flows, and executing hitless signature file upgrades.

After identifying the application in step 330, exemplary method 300 proceeds to step 340, where DPI device 132 determines whether the identified application is known to application-aware router 130. Thus, in various exemplary embodiments, DPI device 132 queries a table, database, or other mapping to determine whether the application is known to application-aware router 130.

When, in step 340, it is determined that the application is known, exemplary method 300 proceeds to step 350, where DPI device 132 associates application-identifying information with the packet. Thus, in various exemplary embodiments, DPI device 132 adds information to the packet header, such as a DSCP marking, or otherwise associates the application information with the packet. DPI device 132 then sends the information to routing module 134.

Exemplary method 300 then proceeds to step 355, where routing module 134 accesses mapping 200 to determine the tunnel 142, 144, 146 through which the packet should be forwarded. In various exemplary embodiments, routing module 134 then sends the packet into the identified tunnel 142, 144, 146 using the appropriate MPLS header information. Exemplary method 300 then proceeds to step 370, where exemplary method 300 stops.

When, in step 340, it is determined that the application is unknown, exemplary method 300 proceeds to step 360, where DPI device 132 sends the packet to routing module 134 without adding application-identifying information. Exemplary method 300 then proceeds to step 365, where routing module 134 sends the packet using non-application aware routing. Thus, in various exemplary embodiments, routing module 134 sends the packet into a predetermined tunnel used for unknown applications. Alternatively, routing module 134 sends the packet into a tunnel based on information other than the application associated with the packet. Exemplary method 300 then proceeds to step 370, where exemplary method 300 stops.

It should be apparent that although exemplary method 300 is described above as involving the interaction of DPI device 132 and routing module 134, various exemplary embodiments utilize different devices for execution of the described steps. Thus, in various exemplary embodiments, all steps illustrated in FIG. 3, including DPI processing and packet routing, are performed by a single integrated device.

Referring now to FIGS. 1-3, in a first specific example, a subscriber 105 initiates a peer-to-peer transfer involving exchange of data over MPLS core network 140. Subscriber 105 initiates the data transfer by sending a number of packets of data from subscriber equipment 110 over network 120. After the packets travel through network 120, application-aware router 130 receives a first packet of the data packets in step 320 of FIG. 3. In step 330, DPI device 132 of application-aware router 130 analyzes the data packet and, in step 340, determines that the packet is associated with a peer-to-peer transfer application. Accordingly, DPI device 132 marks the packet in step 350 and sends the packet to routing module 134 of application-aware router 130.

In step 360, routing module 134 accesses mapping 200 and determines that packets associated with peer-to-peer applications should be sent over tunnel 3 146. Accordingly, routing module 134 applies the appropriate MPLS header information to the packet and sends the packet into tunnel 3 146. Subsequent peer-to-peer packets received at application-aware router 130 follow the same process, thereby allowing application-aware router 130 to send the network-intensive peer-to-peer transfer through a single tunnel.

According to the forgoing, various exemplary embodiments enable an application-aware router to associate each tunnel in an MPLS core network with a different set of applications. Accordingly, in various exemplary embodiments, the service provider may sell tiered application-specific services to subscribers, thereby allowing subscribers to choose the desired services. For example, a user who desires to use the network for peer-to-peer transfer may find it worthwhile to pay an additional service fee to ensure the required quality of service, while a user who only sends email may find the additional bandwidth unnecessary. Thus, in various exemplary embodiments, application-aware routing within an MPLS network guarantees a specified quality of service, while preserving network neutrality to ensure that any individual with network access may run applications in a best effort manner.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for application-aware forwarding of data packets through a Multi Protocol Label Switching (MPLS) core network, the method comprising:
   assigning a predetermined MPLS tunnel to unknown applications;
   receiving a data packet;
   analyzing the data packet using deep packet inspection (DPI) to determine an application associated with the data packet;
   determining whether the application is known;
   marking the data packet according to the determination by the DPI to associate the known application with the data packet;
   when the application is known, determining an MPLS tunnel corresponding to the application associated with the data packet;
   forwarding the data packet through the MPLS tunnel based on the application associated with the data packet; and
   when the application is unknown, forwarding the data packet through the predetermined MPLS tunnel.

2. The method for application-aware forwarding of data packets through the MPLS core network according to claim 1, wherein the step of analyzing the data packet using DPI further comprises:
   examining any combination of information in OSI layers 2 through 7 of the data packet.

3. The method for application-aware forwarding of data packets through the MPLS core network according to claim 1, wherein the step of analyzing the data packet using DPI further comprises:
   analyzing the data packet to match an application signature.

4. The method for application-aware forwarding of data packets through the MPLS core network according to claim 1, wherein the marking is a Differentiated Services Code Point (DSCP).

5. The method for application-aware forwarding of data packets through the MPLS core network according to claim 1, wherein the step of determining the MPLS tunnel corresponding to the application further comprises:
   accessing a mapping, the mapping indicating a correspondence between a plurality of applications and a plurality of MPLS tunnels.

6. The method for application-aware forwarding of data packets through the MPLS core network according to claim 1, further comprising:
   selecting the application associated with the data packet from the group consisting of voice over IP, an instant messaging application, a web browser, an email application, a video application, an audio application, and a peer-to-peer application.

7. The method for application-aware forwarding of data packets through the MPLS core network according to claim 1, wherein the DPI determines whether the packet is associated with a peer-to-peer transfer application.

8. A system for application-aware forwarding of data packets through the MPLS core network, the system comprising:
   a deep packet inspection (DPI) hardware device, the DPI hardware device analyzing a data packet to determine an application associated with the data packet and marking the data packet according to the determined application; and
   a routing module, the routing module receiving the data packet from the DPI hardware device and forwarding the data packet through an MPLS tunnel corresponding to the application associated with the data packet, when the application is known, and forwarding the data packet through a predetermined MPLS tunnel when the application is unknown.

9. The system for application-aware forwarding of data packets through the MPLS core network according to claim 8, wherein the DPI hardware device and the routing module are integrated into a single networking device.

10. The system for application-aware forwarding of data packets through the MPLS core network according to claim 9, wherein the networking device is a router.

11. The system for application-aware forwarding of data packets through the MPLS core network according to claim 8, wherein the DPI hardware device is a standalone device coupled to a networking device, the networking device comprising the routing module.

12. The system for application-aware forwarding of data packets through the MPLS core network according to claim 8, wherein the DPI hardware device examines information in layers 2 through 7 of the data packet.

13. The system for application-aware forwarding of data packets through the MPLS core network according to claim 8, wherein the DPI hardware device analyzes the data packet to match an application signature.

14. The system for application-aware forwarding of data packets through the MPLS core network according to claim 8, wherein the marking is a Differentiated Services Code Point.

15. The system for application-aware forwarding of data packets through the MPLS core network according to claim 8, wherein the routing module identifies the MPLS tunnel by accessing a mapping, the mapping indicating a correspondence between a plurality of applications and a plurality of MPLS tunnels.

16. The system for application-aware forwarding of data packets through the MPLS core network according to claim 8, wherein the DPI hardware device determines whether the packet is associated with a peer-to-peer transfer application.

17. A non-transitory computer-readable medium encoded with instructions for forwarding a data packet through a Multi Protocol Label Switching (MPLS) core network, the computer readable medium comprising:
   instructions for assigning a predetermined MPLS tunnel to unknown applications;
   instructions for analyzing the data packet using deep packet inspection (DPI) to determine an application associated with the data packet;
   instructions for marking the data packet according to the determination by the DPI to associate the known application with the data packet;

instructions for determining an MPLS tunnel corresponding to the application associated with the data packet; and instructions for forwarding the data packet through the MPLS tunnel corresponding to the application associated with the data packet, when the application is known, and forwarding the data packet through the predetermined MPLS tunnel when the application is unknown.

18. The non-transitory computer readable medium encoded with instructions for forwarding the data packet through the MPLS core network according to claim 17, wherein the marking is a Differentiated Services Code Point.

19. The non-transitory computer-readable medium encoded with instructions for forwarding the data packet through the MPLS core network according to claim 17, wherein the application associated with the data packet is selected from the group consisting of a web browser, an email application, a video application, and a peer-to-peer application.

20. The non-transitory computer-readable medium encoded with instructions for forwarding the data packet through the MPLS core network according to claim 17, wherein the DPI determines whether the packet is associated with a peer-to-peer transfer application.

\* \* \* \* \*